United States Patent
Zayatz

(10) Patent No.: US 6,426,867 B1
(45) Date of Patent: Jul. 30, 2002

(54) PROTECTION DEVICE HAVING TAPERED RIBS AND METHOD OF ASSEMBLING A BATTERY WITH A PROTECTION DEVICE AND AN ELECTRICAL COMPONENT

(75) Inventor: Robert Zayatz, North Tonawanda, NY (US)

(73) Assignee: Wilson Greatbatch, Ltd., Clarence, NY (US)

( * ) Notice: Subject to any disclaimer, the term of this patent is extended or adjusted under 35 U.S.C. 154(b) by 0 days.

(21) Appl. No.: 09/565,811

(22) Filed: May 5, 2000

(51) Int. Cl.⁷ .................... H02H 5/04; H01H 85/044; H01M 2/04; H01M 2/30
(52) U.S. Cl. ............. 361/626; 361/104; 361/103; 429/7; 429/172; 429/181; 429/185; 429/171; 337/186; 337/187
(58) Field of Search .................... 361/626, 103, 361/104, 517, 518; 439/250, 366; 429/7, 163–174, 178, 181, 185; 337/186, 187

(56) References Cited

U.S. PATENT DOCUMENTS

| | | | | |
|---|---|---|---|---|
| 3,081,366 A | * | 3/1963 | Belove ............... 320/147 |
| 3,663,301 A | | 5/1972 | Ralston et al. ......... 136/107 |
| 3,841,913 A | | 10/1974 | Anderson ............. 136/107 |
| 4,047,790 A | | 9/1977 | Carino ............... 339/220 |
| 4,091,181 A | * | 5/1978 | Merritt, Jr. ........... 429/231 |
| 4,238,555 A | * | 12/1980 | Uetani et al. .......... 429/163 |
| 4,302,517 A | | 11/1981 | Dziak ................. 429/66 |
| 4,457,990 A | * | 7/1984 | Tucholski ............ 429/162 |
| 4,670,362 A | | 6/1987 | Wiacek et al. ......... 429/174 |
| 4,957,832 A | * | 9/1990 | Ruggeberg et al. ..... 429/164 |
| 4,970,073 A | | 11/1990 | Arzur et al. .......... 429/152 |
| 4,973,936 A | * | 11/1990 | Dimpault-Darcy et al. . 338/221 |
| 5,194,340 A | | 3/1993 | Kosako .............. 429/1 |
| 5,264,303 A | | 11/1993 | McCaffery ........... 429/99 |
| 5,283,137 A | | 2/1994 | Ching ............... 429/175 |
| 5,376,467 A | | 12/1994 | Abe et al. ........... 429/7 |
| 5,434,017 A | | 7/1995 | Berkowitz et al. ..... 429/94 |
| 5,529,858 A | | 6/1996 | Wicker et al. ........ 429/149 |
| 5,532,081 A | | 7/1996 | DePalma et al. ...... 429/171 |
| 5,549,985 A | | 8/1996 | Heller et al. ......... 429/157 |
| 5,589,293 A | | 12/1996 | Pope et al. .......... 429/172 |
| 5,672,443 A | | 9/1997 | Salisbury et al. ..... 429/185 |
| 5,750,283 A | | 5/1998 | DePalma et al. ...... 429/56 |
| 5,759,713 A | | 6/1998 | DePalma et al. ...... 429/54 |
| 5,770,328 A | | 6/1998 | Friedli et al. ........ 429/96 |
| 5,776,631 A | | 7/1998 | Wu .................. 429/171 |

(List continued on next page.)

FOREIGN PATENT DOCUMENTS

| JP | 10-154530 A | * | 6/1998 | .......... H01M/10/40 |
|---|---|---|---|---|
| JP | 2000-277067 A | * | 10/2000 | .......... H01M/2/08 |

OTHER PUBLICATIONS

Patent Abstracts of Japan Publication No. 07201358, Publication date Aug. 4, 1995.
Patent Abstracts of Japan Publication No. 09231959, Publication date Sep. 5, 1997.
Patent Abstracts of Japan Publication No. 11026029, Publication date Jan. 29, 1999.

*Primary Examiner*—Anatoly Vortman
(74) *Attorney, Agent, or Firm*—Hodgson Russ LLP

(57) ABSTRACT

A protection device for an electrical component that has a protective housing and a terminal cap. The protective housing has a base with a contact hole therethrough for accommodating an electrical terminal pin. A projecting perimeter wall extends from the base. Attached to the perimeter wall is an inwardly extending tapered rib. Each rib is tapered such that the end of each rib closest to the base surface extends from the perimeter wall further than the end of the rib furthest from the base surface. A terminal cap is placed within the perimeter wall and forced toward the base surface until the tapered ribs engage and are deformed by the terminal cap to provide an interference fit between the ribs and the terminal cap. A method of assembling a battery and an electrical component with such a protection device is also disclosed.

18 Claims, 5 Drawing Sheets

U.S. PATENT DOCUMENTS

| | | | |
|---|---|---|---|
| 5,786,980 A | 7/1998 | Evans | 361/502 |
| 5,821,010 A | 10/1998 | Taylor | 429/172 |
| 5,843,597 A | 12/1998 | Getz | 429/174 |
| 5,939,217 A * | 8/1999 | Tamura et al. | 429/53 |
| 5,993,990 A * | 11/1999 | Kanto et al. | 429/59 |
| 6,205,034 B1 * | 3/2001 | Zayatz | 361/824 |
| 6,317,335 B1 * | 11/2001 | Zayatz | 361/600 |

* cited by examiner

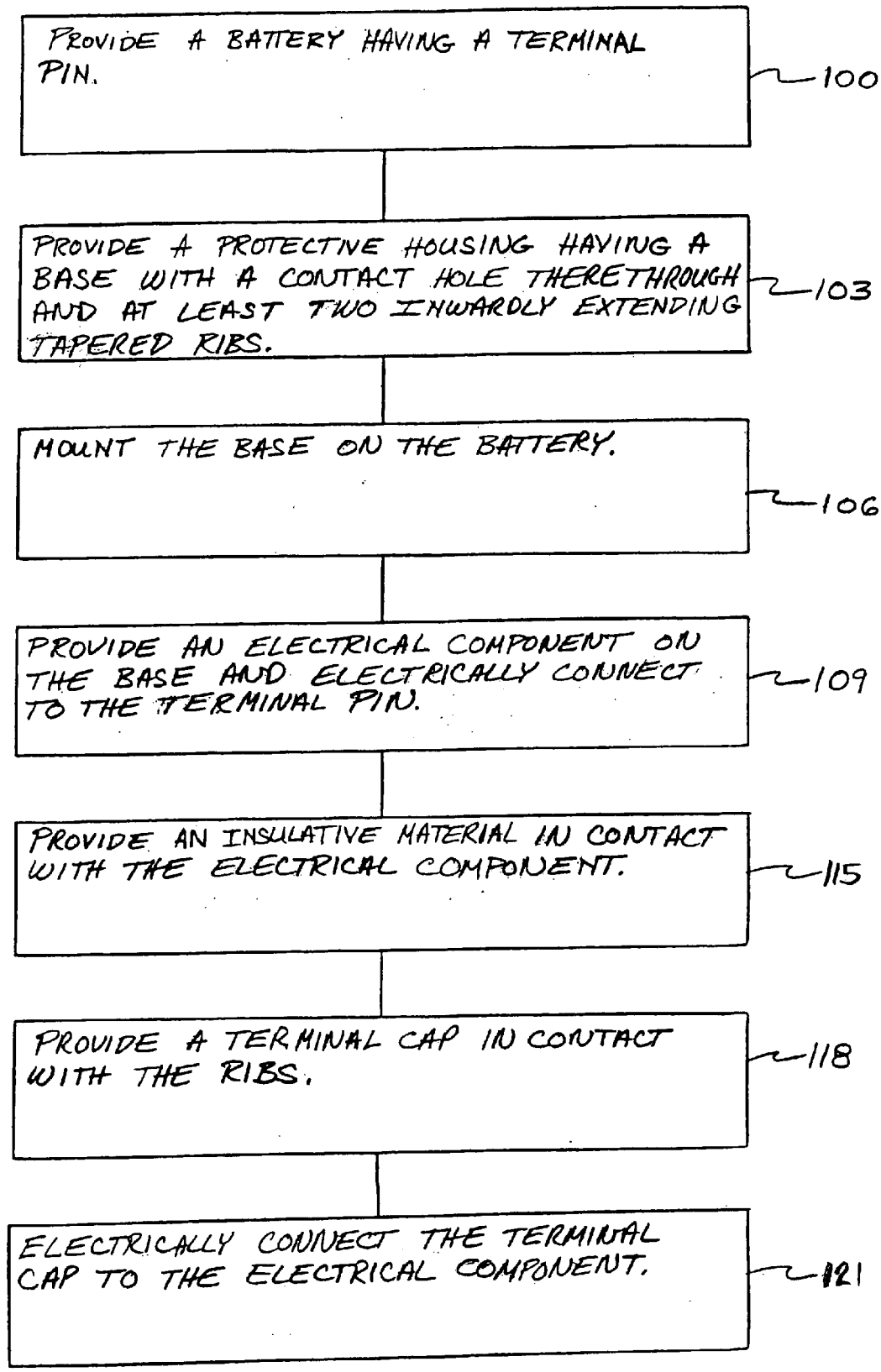

US 6,426,867 B1

PROTECTION DEVICE HAVING TAPERED RIBS AND METHOD OF ASSEMBLING A BATTERY WITH A PROTECTION DEVICE AND AN ELECTRICAL COMPONENT

BACKGROUND OF THE INVENTION

1. Field of the Invention

The present invention relates generally to devices for protecting an electrical component. More specifically, the present invention relates to a protection device for an electrical component connected to a battery.

2. Discussion of Related Art

In the prior art, there are devices for protecting an electrical component, such as a fuse, connected to a battery. Such prior art devices include a cylindrical spacer ring and a terminal cap. The spacer ring is positioned on an end of the battery. The electrical component resides within the spacer ring, and is electrically connected to the battery by at least one, and sometimes two electrical, leads. Another electrical lead of the electrical component is connected to the terminal cap.

To assemble the battery, the electrical component and the prior art spacer ring, an electrically insulating half-moon disk is placed on the battery header. Next, the electrical component is placed on the half-moon disk. Then the first electrical lead of the electrical component is welded to a terminal pin of the battery. If provided, a second electrical lead of the electrical component is welded to the header of the battery. Next, the spacer ring is placed on the battery so as to encircle the electrical component. Then the volume within the spacer ring and above the battery, which is not occupied by the electrical component, is filled with an insulative adhesive material, which may be a polyamide material such as AD-TECH 700 manufactured by Adhesive Technologies, Inc. of Hampton, N.H. (sometimes referred to as "hot-melt"), or which may be an epoxy or silicone material. In doing so, the electrical component is substantially covered with the adhesive material. Only a portion of an electrical lead of the electrical component extends out of and is not entirely covered with the adhesive material. Next, an insulating disk is placed partially into the adhesive material, and a terminal cap is placed over the insulating disk, as well as that portion of the adhesive material which is not covered by the insulating disk. Finally, the exposed electrical lead of the electrical component extending from the adhesive material is welded to the terminal cap.

Such prior art assemblies have disadvantages. For example, the terminal cap can disconnect from the rest of the assembly.

SUMMARY OF THE INVENTION

Accordingly, it is an object of the present invention to provide a protection device that will more securely hold the terminal cap to the rest of the assembly.

The foregoing objective is realized by the present invention, which is a protection device for an electrical component that has a protective housing and a terminal cap. The protective housing has a base with a contact hole therethrough for accommodating an electrical terminal pin. A projecting perimeter wall extends from the base. Attached to the perimeter wall is an inwardly extending tapered rib. The tapered rib is oriented such that a longitudinal axis of each rib is substantially perpendicular to the base surface. Each rib is tapered such that the end of each rib closest to the base surface extends from the perimeter wall further than the end of the rib furthest from the base surface. A terminal cap is placed within the perimeter wall and forced toward the base surface until the tapered ribs engage and are deformed by the terminal cap to provide an interference fit between the ribs and the terminal cap. The deformation of the ribs holds the terminal cap securely to the protective housing. As described herein, the protective housing can be used with a power providing device, such as a battery.

In a method according to the present invention, a battery and an electrical component are assembled. The method begins by providing a battery having a terminal pin, and providing a protective housing having a base with a contact hole therethrough. The protective housing is mounted on the battery so the terminal pin extends into the contact hole. Next, an electrical component is provided on the base and electrically connected to the terminal pin. Finally, a terminal cap is provided in contact with the protective housing and connected to the electrical component.

Other objects and advantages of the present invention will become apparent to those skilled in the art from the following detailed description read in conjunction with the attached drawings and claims appended hereto.

BRIEF DESCRIPTION OF THE DRAWINGS

For a fuller understanding of the nature and objects of the invention, reference should be made to the following detailed description taken in conjunction with the accompanying drawings, in which:

FIG. 7 is a flow chart of a method according to the present invention.

BEST MODE FOR CARRYING OUT THE INVENTION

Figure 1:
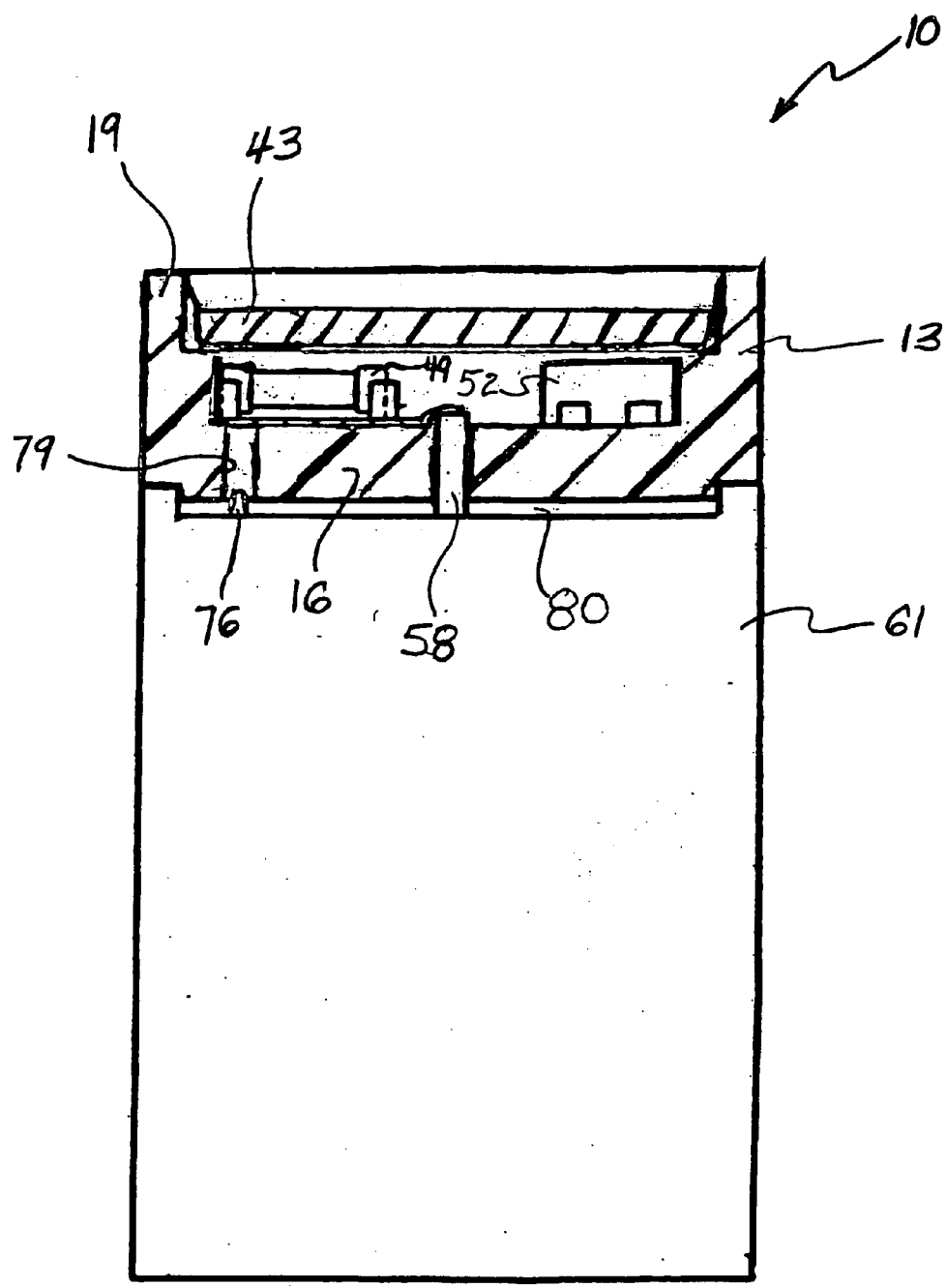
FIG. 1 is a partially cross sectioned side view of a protection device according to the present invention mounted on a battery.
Figure 2:
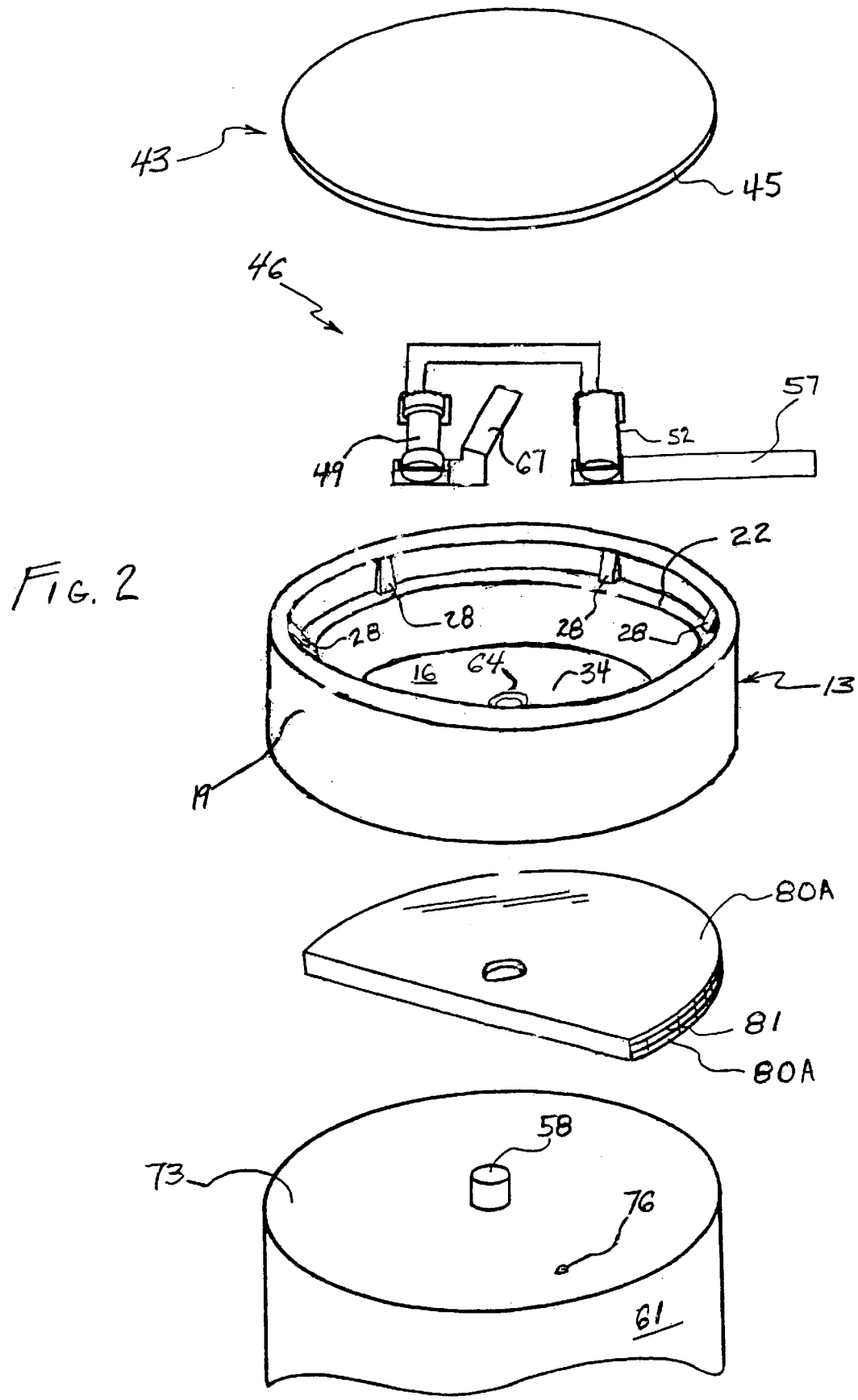
FIG. 2 is an exploded perspective view of the protection device and battery similar to that shown in FIG. 1.
Figure 3:
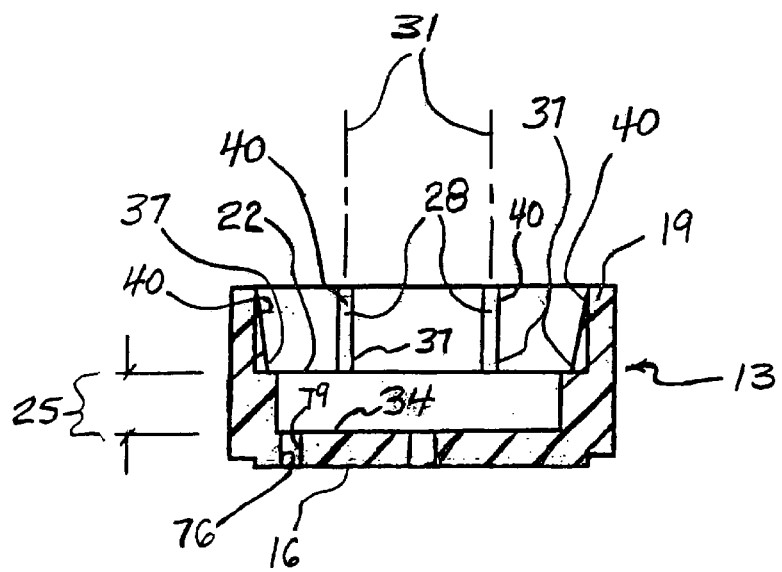
FIG. 3 is a cross sectioned side view of the protective housing shown in FIGS. 1 and 2.

FIGS. 1 and 2 show a protection device 10 according to the present invention. The protection device 10 includes a protective housing 13 (shown also in FIGS. 3, 4, 5 and 6) having a base 16. As shown in FIGS. 1 through 4, extending from the base 16 is a perimeter wall 19 having an inner ledge 22. The inner ledge 22 is spaced from the base 16 a distance 25. The perimeter wall 19 extends generally perpendicularly from the base 16.

Figure 4:
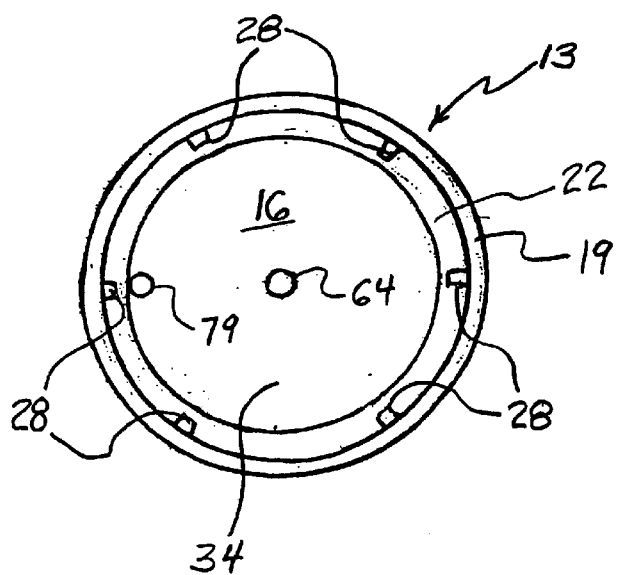
FIG. 4 is a top view of the protective housing shown in FIGS. 1 and 2.
Figure 6:
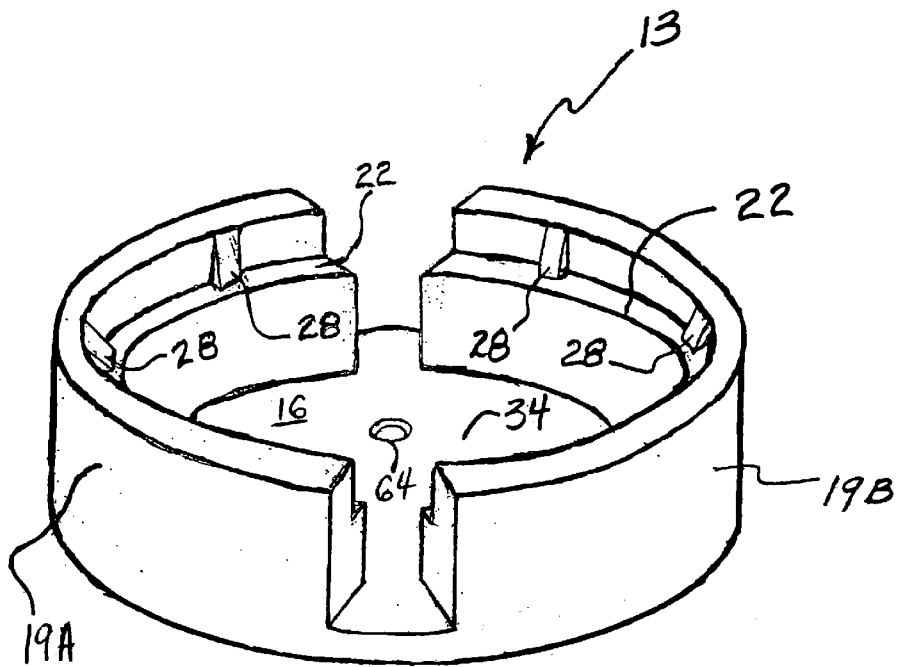
FIG. 6 is a perspective view of an alternative embodiment of a protective housing according to the present invention.

The protective housing 13 has at least two radially inwardly extending tapered ribs 28 attached to the perimeter wall 19. There are preferably at least three separate ribs 28. A measure of safety can be provided if four or more ribs 28 are provided, as shown in FIGS. 2, 4 and 6. Each rib 28 is oriented such that a longitudinal axis 31 of each rib 28 is substantially perpendicular to a primary surface 34 of the base 16. Each rib 28 is tapered such that a first end 37 of each rib 28 closest to the primary surface 34 of the base 16 extends from the perimeter wall 19 further than a second end 40 of each rib 28 furthest from the primary surface 34. A material which is suitable for the protective housing 13 is 6/6 nylon.

The protection device 10 according to the present invention also includes a terminal cap 43 having a perimeter edge 45. When assembled with the protective housing 13, the perimeter edge 45 contacts and is held relative to the protective housing 13 by an interference fit with the ribs 28.

FIGS. 1 and 2 show the relative position of an electrical component 46 with respect to the protective housing 13 and the terminal cap 43. The electrical component 46 may include a fuse 49 electrically connected to a diode 52. The distance 25 is chosen to allow the electrical component 46 to rest on the primary surface 34 of the base 16 without extending beyond the inner ledge 22. The inner ledge 22 is provided to prevent the terminal cap 43 from contacting any part of the electrical component 46, except for a second lead 57, as described below. A terminal pin 58 of a battery 61 extends through a contact hole 64 in the base 16 and is connected to a first lead 67 of the electrical component 46 by welding the first lead 67 to the terminal pin 58.

When manufacturing certain types of batteries 61, electrolyte is introduced through a header 73 of the battery 61 using a fill hole. Once the battery 61 has the proper amount of electrolyte inside, the fill hole is closed, usually by welding a metallic material to the header 73. The metallic material often extends from the header 73 as a metallic projection 76, which is best seen in FIG. 2. Although the metallic projection 76 does not extend far beyond the header 73, since the header 73 serves as a supporting surface for the base 16 and it is desirable to have the base 16 firmly supported by the header 73, an accommodating orifice 79 may be positioned in the base 16 to accommodate the metallic projection 76 therein.

To secure the base 16 to the header 73, a means for fastening may be provided. For example, the base 16 may be fixed relative to the header 73 by placing an adhesive 80 between the base 16 and the header 73. The adhesive 80 may be placed between the base 16 and the header 73 by any of the well known methods, including spraying, pouring or mixing the adhesive on one or more of the base 16 and the header 73. An acceptable adhesive 80 is cyanoacrylate. Another acceptable adhesive 80 is a pressure sensitive adhesive, such as product number 9500 manufactured by the 3M Company located in Minnetonka, Minnesota.

The present invention may also include a sheet 81 between the base 16 and the header 73. The sheet 81 allows the protection device 10 to be seated firmly on the header 73, even when the header 73 or the base 16 has irregularities in it. A preferred sheet 81 is made from an aramid insulating paper, such as Nomex 410™, and is preferably approximately between 0.002 and 0.005 inches thick. To facilitate assembly of the protection device 10 to the header 73, the sheet 81 may have one or more adhesive layers 80A for bonding to the header 73 and/or the base 16. As shown in FIG. 2, there are In adhesive layers 80A on opposite sides of the sheet 81, however, the sheet 81 need not have two adhesive layers 80A, and may have only one or no adhesive layers 80A.

The adhesive layer 80A may be the adhesive material described above. In addition, the 3M Company manufactures a polyester film tape, product number 9731, that can serve as a sheet 81 and adhesive layers 80A. It should be noted that the thickness of the sheet 81 and the adhesive layers 80A shown in FIG. 2 are not drawn to scale in order that the sheet 81 and the adhesive layers 80A can be more easily understood. In one embodiment of the present invention, the adhesive is selected to withstand temperatures above 200° C.

Figure 5:
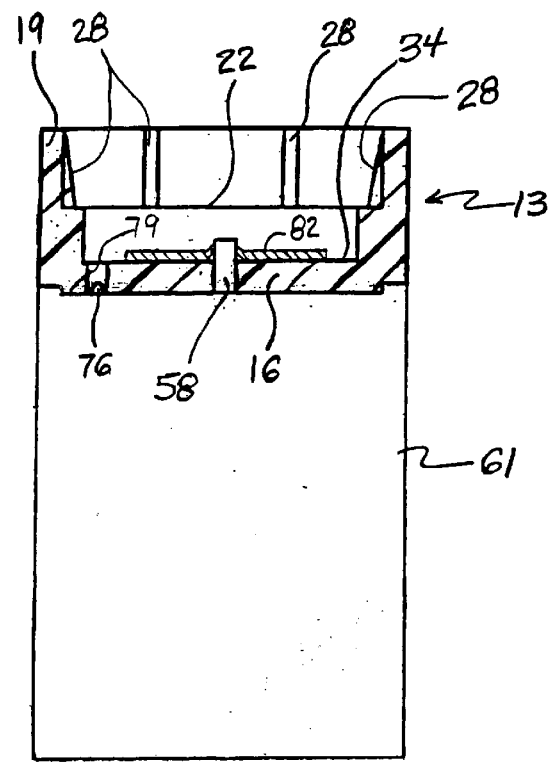
FIG. 5 is a cross sectioned side view of the protective housing shown in FIGS. 1 and 2, mounted on a battery (not in cross section), and including a tinnerman type fastener.

Alternatively, a shrink-wrap may be applied around the battery 61 and the protective housing 13. Such a shrink-wrap is described in U.S. patent application Ser. No. 09/404,934, which is incorporated herein by reference. In addition, as shown in FIG. 5, the means for fastening may be a tinnerman type fastener 82 which contacts the base 16, and attaches to a portion of the terminal pin 58 extending through the contact hole 64. The tinnerman fastener 82 is preferably made from a nonconductive material such as 6/6 nylon.

The terminal cap 43 is preferably electrically conductive. A second lead 57, shown in FIG. 2, is electrically connected to the terminal cap 43. The second lead 57 may be electrically connected to the terminal cap 43 by welding.

In an alternative embodiment of the present invention, more than one perimeter wall 19 may be provided, as shown in FIG. 6. In the alternative embodiment shown in FIG. 6, there is a first perimeter wall 19A and a second perimeter wall 19B. Each perimeter wall 19A, 19B has at least one rib 28.

FIG. 7 shows steps of a method according to the present invention in which a battery and an electrical component, such as those described above, are assembled. The method begins by providing (step 100) a battery having a terminal pin, and providing (step 103) a protective housing having a base with a contact hole therethrough, and at least two inwardly extending tapered ribs. The base is mounted (step 106) on the battery so that the terminal pin extends into the contact hole. Next, an electrical component is provided on the base, and the electrical component is electrically connected (step 109) to the terminal pin. Then, a terminal cap is provided (step 118) in contact with the ribs, and the terminal cap is electrically connected (step 121) to the electrical component. In an alternative embodiment of the method according to the present invention, an insulating material, such as the AD-TECH 700 material described above, is provided (step 115) in contact with the electrical component to fix the electrical component within the protective housing. It will now be apparent to those skilled in the art that the insulating material need not have an adhesive quality to it because the ribs will hold the terminal cap to the protective housing.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A protection device for protecting an electrical component, comprising:

a protective housing having a base with a contact hole therethrough for receiving an electrical terminal pin, and having a projecting perimeter wall extending from the base, at least two inwardly extending tapered ribs attached to the perimeter wall, each rib being tapered such that a first end of each rib closest to the primary surface of the base extends from the perimeter wall further than a second end of each rib furthest from the base; and a terminal cap having a perimeter edge joined to the ribs and permitting the electrical component to reside between and be protected by the housing and the terminal cap.

2. The protection device of claim 1, wherein the base has an orifice therethrough for receiving a projection on a supporting surface which supports the base.

3. The protection device of claim 1, further including a means for fastening contacting the base and attached to an electrical terminal pin extending through the contact hole.

4. The protection device of claim 3, wherein the means for fastening is a tinnerman fastener.

5. The protection device of claim 1, further comprising an adhesive contacting the base.

6. The protection device of claim 5, further comprising a sheet having adhesive thereon.

7. The protection device of claim 1, further comprising a sheet having an adhesive on a first side of the sheet and a second side of the sheet.

8. A protection device for protecting an electrical component, comprising:
   a protective housing having a base with a contact hole therethrough for receiving an electrical terminal pin, and having at least two projecting perimeter walls, each perimeter wall extending from the base and having at least one inwardly extending tapered rib attached to the perimeter wall, each rib being tapered such that a first end of each rib closest to the primary surface of the base extends from the respective perimeter wall further than a second end of each rib furthest from the base; and
   a terminal cap having a perimeter edge [in contact with] joined to the ribs and permitting the electrical component to reside between and be protected by the housing and the terminal cap.

9. An electrical power providing unit having a battery, an electrical component electrically connected to the battery, and a protection device for protecting the electrical component, the protection device comprising:
   a protective housing having a base with a contact hole therethrough for receiving a terminal pin of the battery, and having a projecting perimeter wall extending from the base, at least two inwardly extending tapered ribs attached to the perimeter wall, each rib being tapered such that a first end of each rib closest to the primary surface of the base extends from the perimeter wall further than a second end of each rib furthest from the base, wherein the electrical component is supported by the base; and
   a terminal cap having a perimeter edge joined to the ribs and wherein the electrical component resides between the base and the terminal cap.

10. The power providing unit of claim 9, wherein the base has an orifice therethrough for receiving a projection on the battery.

11. The power providing unit of claim 10, wherein the projection is a metallic substance bonded to the battery, and is at least partially residing in the orifice.

12. The power providing unit of claim 11, wherein the metallic substance is characterized as having been welded to the battery.

13. The power providing unit of claim 9, further including a means for fastening holding the base and the terminal pin of the battery.

14. The power providing unit of claim 13, wherein the means for fastening is a tinnerman fastener.

15. The power providing unit of claim 9, further comprising an adhesive between the base and the battery.

16. The power providing unit of claim 15, further comprising a sheet contacting the adhesive.

17. A method of assembling a battery and an electrical component, comprising:
   providing a battery having a terminal pin;
   providing a protective housing having a base with a contact hole therethrough, a perimeter wall and at least two inwardly extending tapered ribs;
   placing the protective housing on the battery so that the terminal pin extends into the contact hole;
   providing an electrical component on the base;
   electrically connecting the electrical component to the terminal pin;
   providing a terminal cap in contact with the tapered ribs; and
   connecting the terminal cap to the electrical component.

18. The method of claim 17, further comprising the step of providing an insulating material on the electrical component.

* * * * *